Aug. 15, 1967 A. W. HOLSTEIN ETAL 3,335,907
SPIRAL VENDOR WITH EMPTY SOURCE INDICATING MEANS
Original Filed Aug. 28, 1963 8 Sheets-Sheet 8

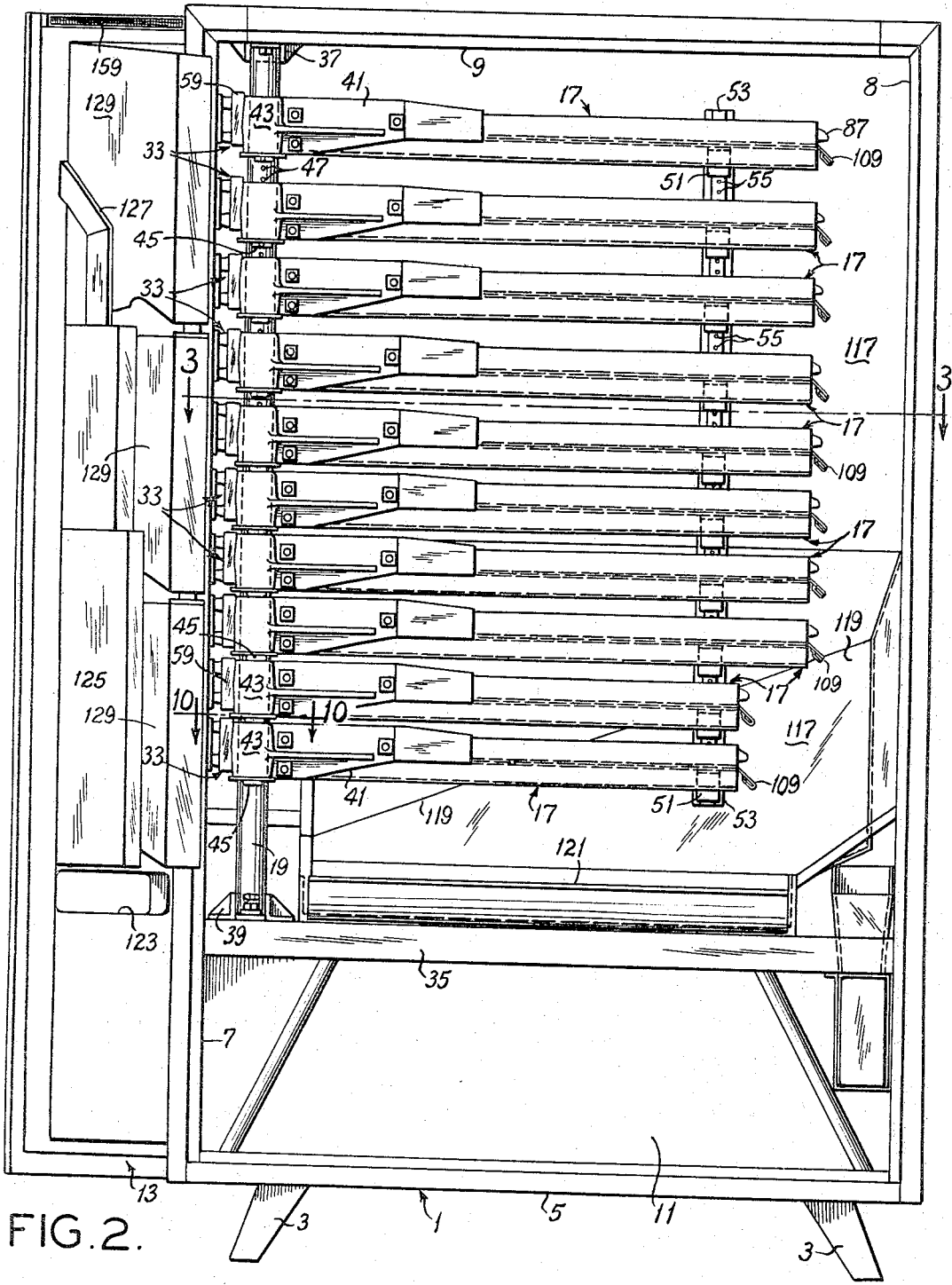
FIG.2.
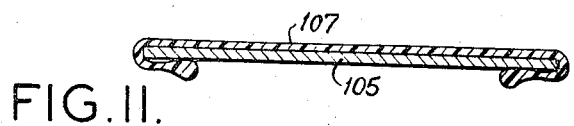
FIG.II.

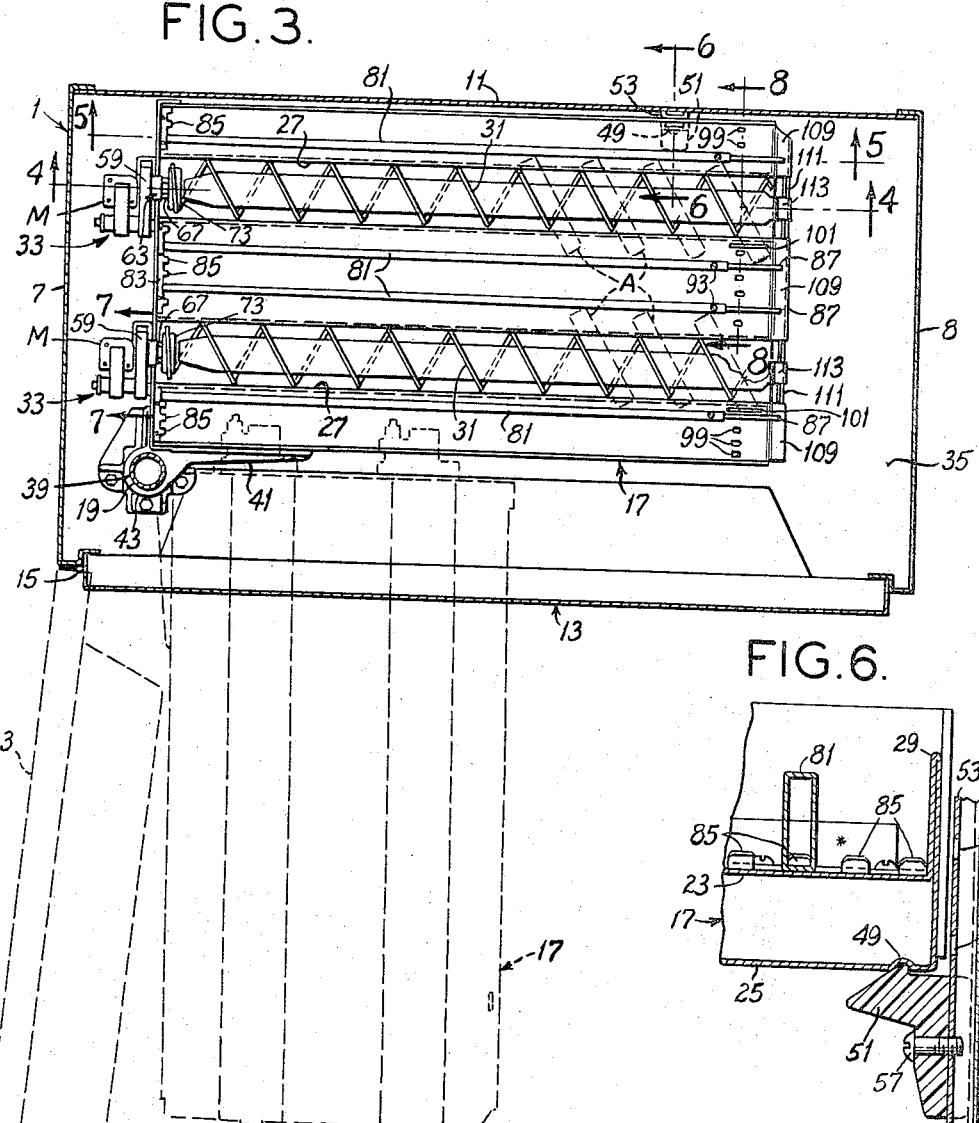
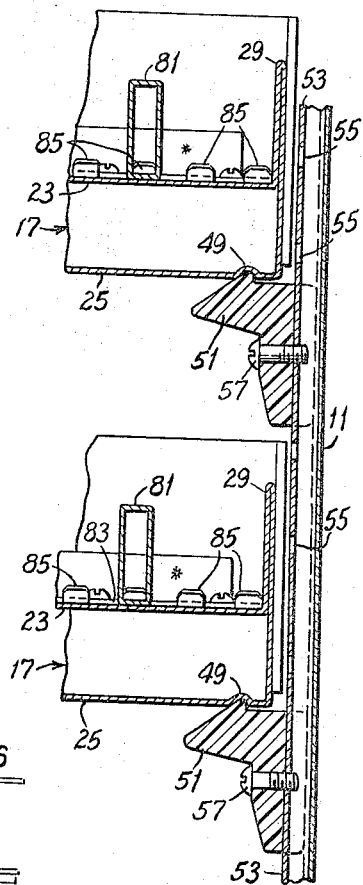
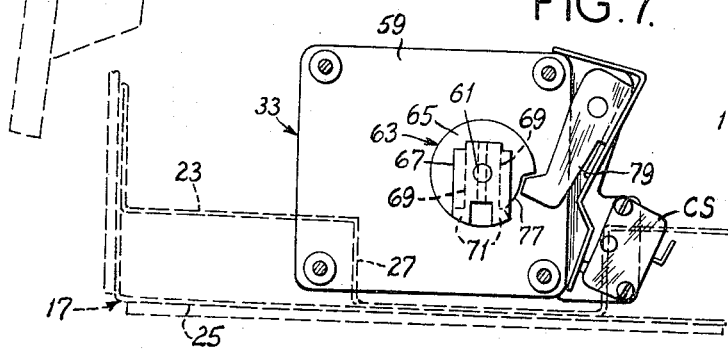

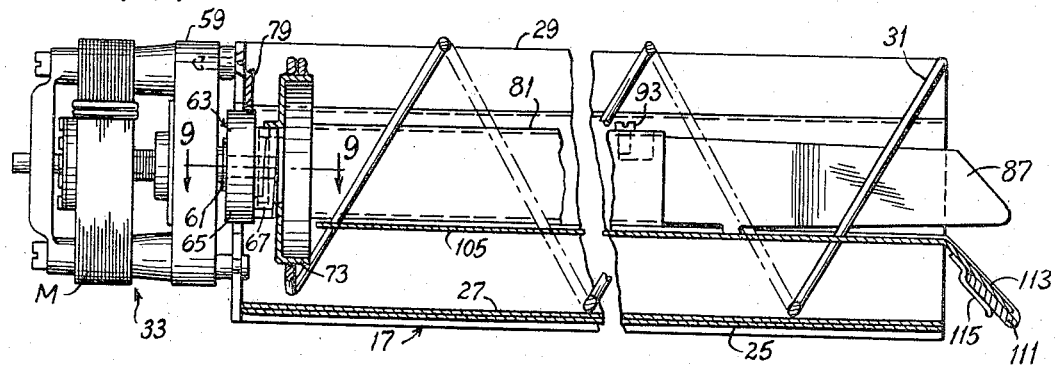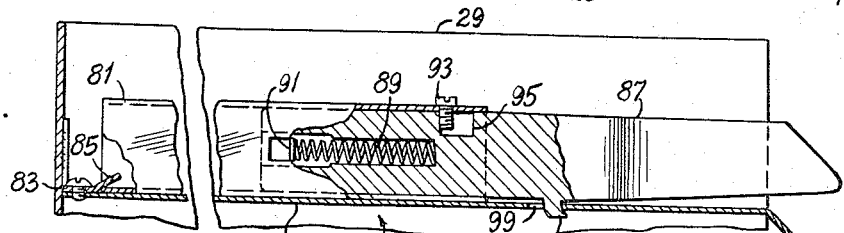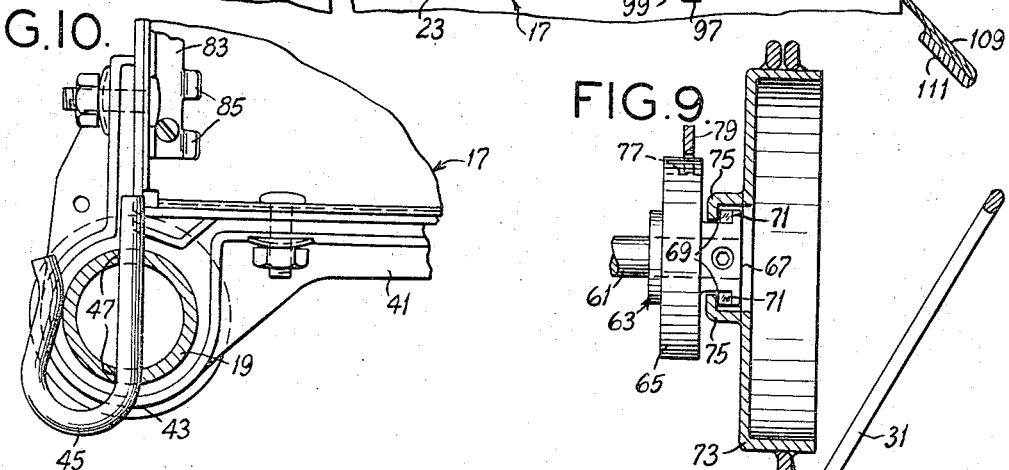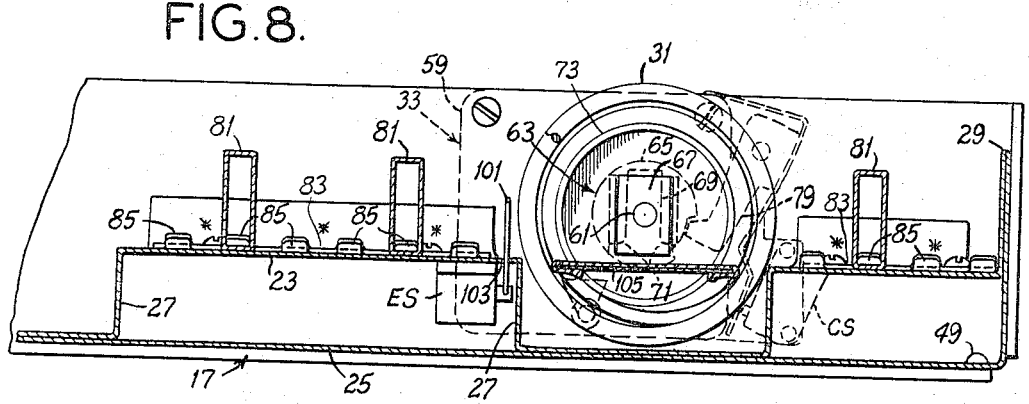

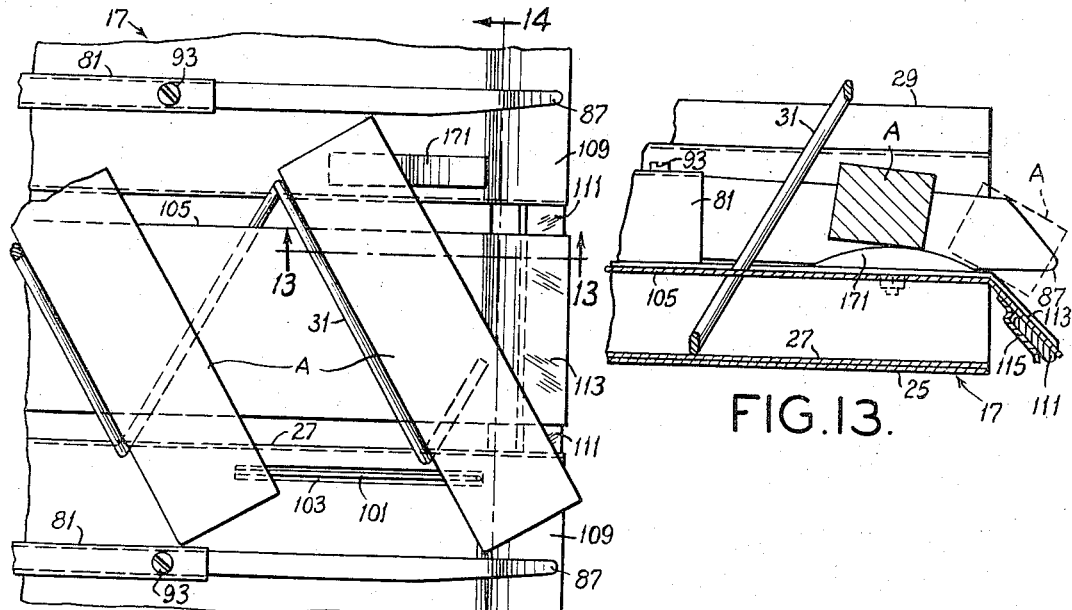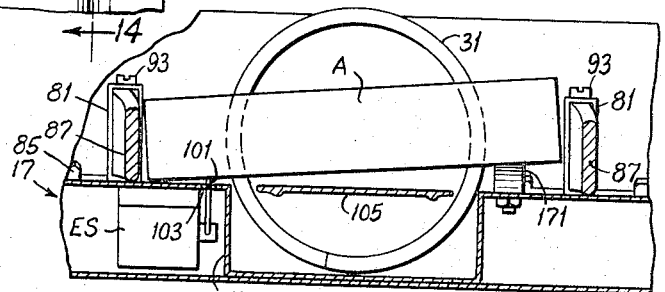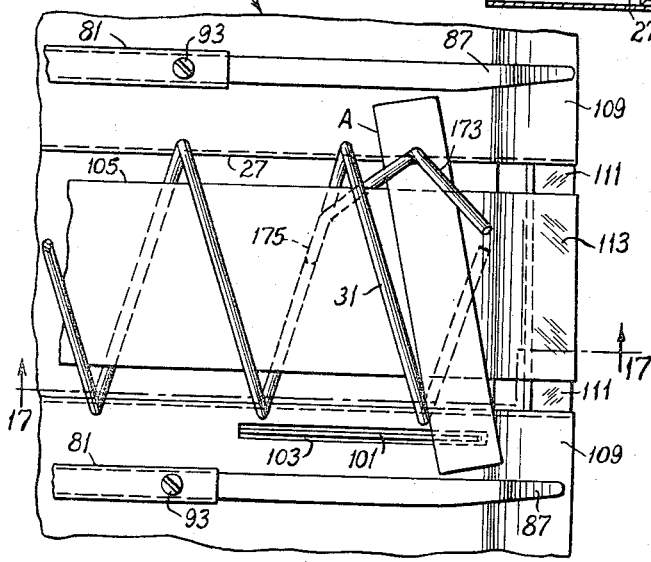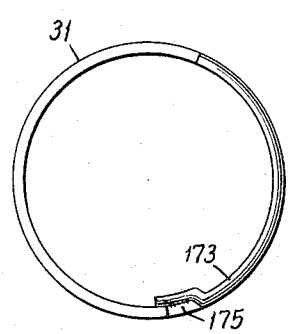

United States Patent Office 3,335,907
Patented Aug. 15, 1967

3,335,907
SPIRAL VENDOR WITH EMPTY SOURCE INDICATING MEANS
Alvin W. Holstein, Brentwood, and James T. Schuller, St. Ann's, Mo., assignors to Universal Match Corporation, St. Louis, Mo., a corporation of Delaware
Continuation of application Ser. No. 305,100, Aug. 28, 1963. This application Mar. 17, 1966, Ser. No. 539,606
7 Claims. (Cl. 221—6)

This application is a continuation of our copending application, Ser. No. 305,100, filed Aug. 28, 1963. This invention relates to vendors, and more particularly to a vendor of a type which may be referred to as a spiral vendor, in which items to be vended (such as candy bars, loose candy in boxes) are dispensed by augering by means of a helix.

The invention is particularly concerned with an improvement on the spiral vendor shown in applicants' United States Patent 3,085,711 issued April 16, 1963, which, in general, comprises a cabinet with a plurality of shelves located one above another in the cabinet, each shelf having a helix extending endwise thereof for feeding items positioned on the shelf between the convolutions of the helix off one end of the shelf, this end being referred to as the discharge end of the shelf, with the shelves adapted for loading from the top. Among the several objects of the invention may be noted the provision of an improved shelf mounting arrangement which enables each shelf to be swung horizontally out of the cabinet for facilitating the loading thereof; the provision of such an arrangement enabling vertical adjustment of the shelves for accommodating items of different heights as positioned on the shelves, thereby conserving space and providing for high capacity of the vendor in relation to its size; the provision of a construction enabling trouble-free vending of packages which have little or no stiffness (as distinguished from boxed or cartoned items which are relatively stiff); and the provision of a construction for assuring trouble-free discharge of items off the discharge end of the shelf. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a front elevation of a vending machine of this invention;

FIG. 2 is a view similar to FIG. 1 with the front door of the vending machine open to show the interior of the machine;

FIG. 3 is a horizontal section taken on line 3—3 of FIG. 2, showing in dotted lines the front door open and a shelf in loading position;

Figure 1:
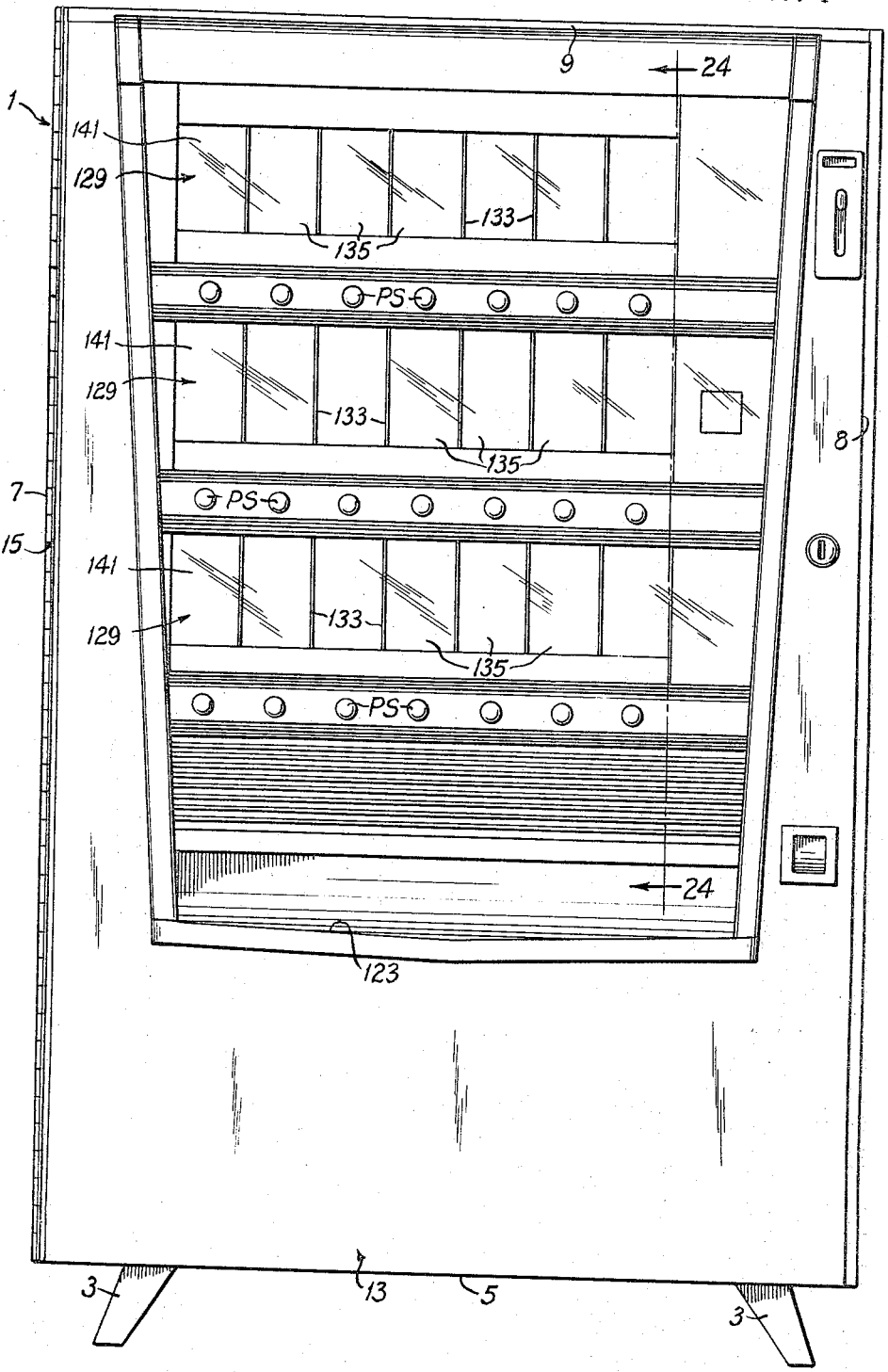
Figure 18:
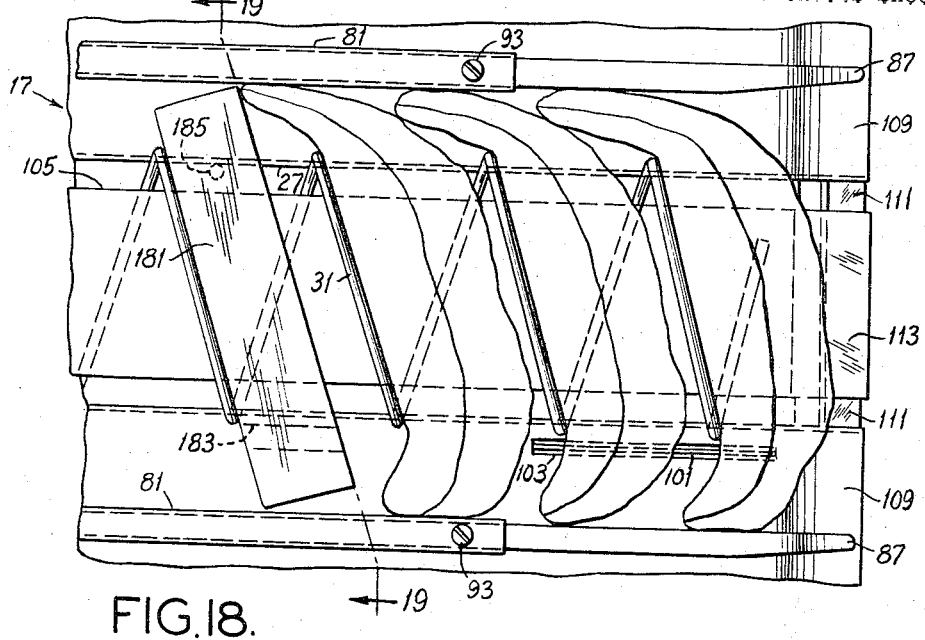
Figure 19:
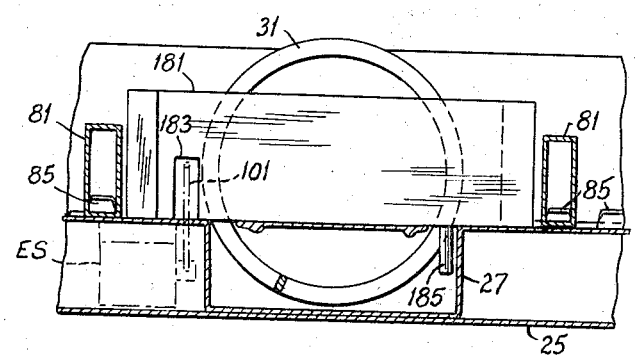
Figure 17:
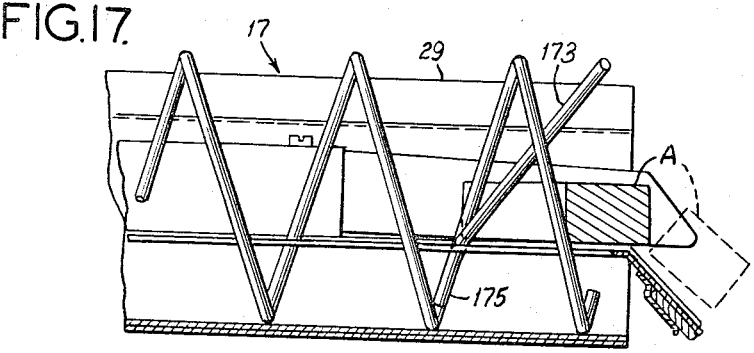
Figure 20:
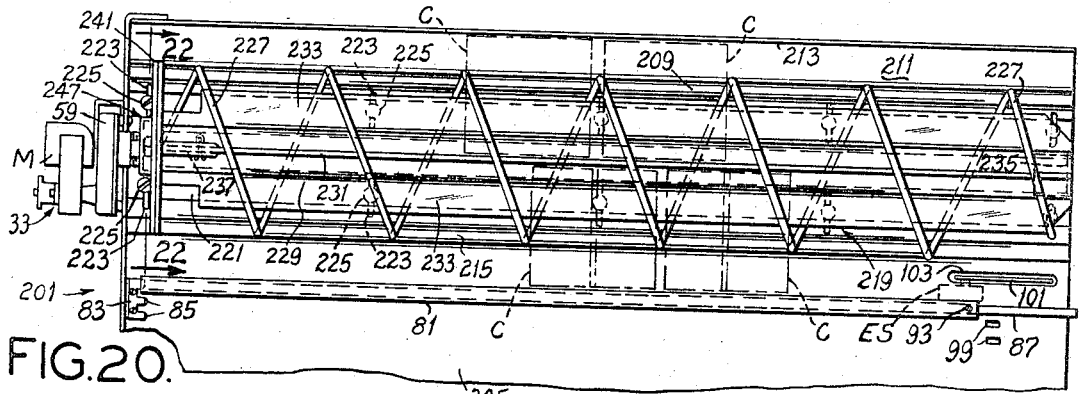
Figure 21:
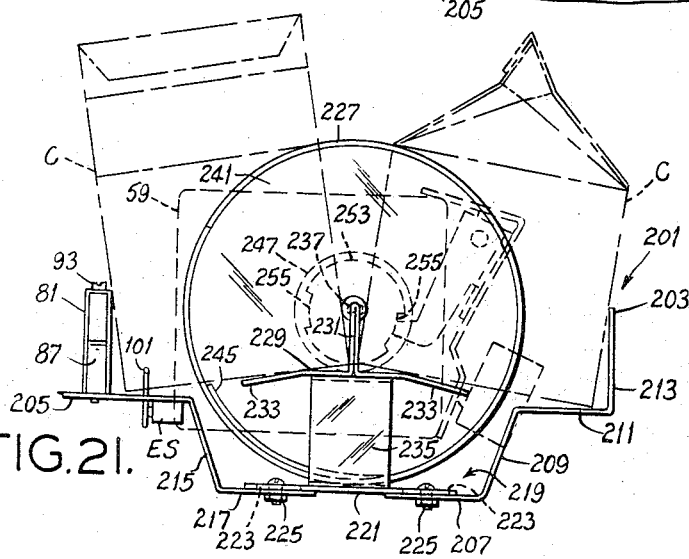
Figure 22:
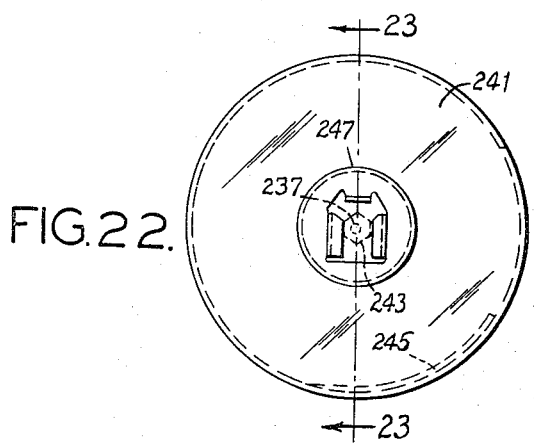
Figure 23:
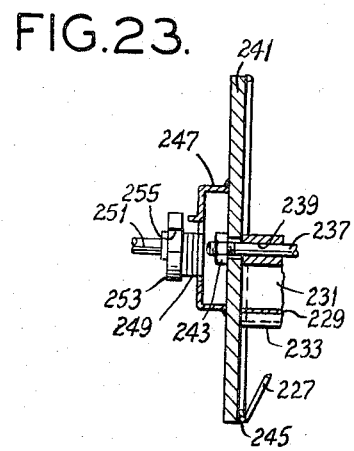
Figure 24:
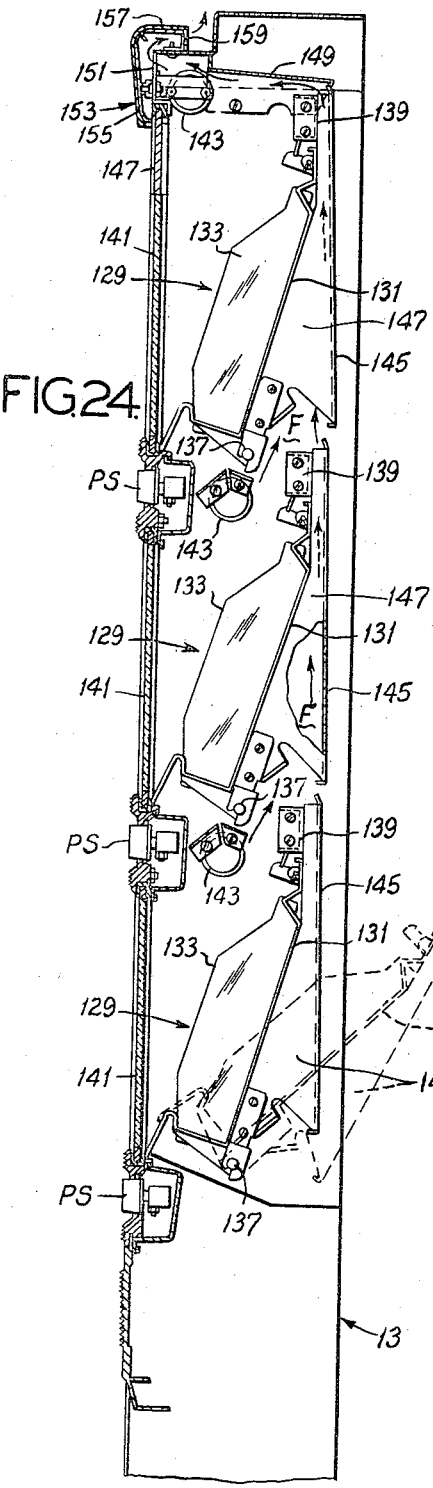
Figure 25:
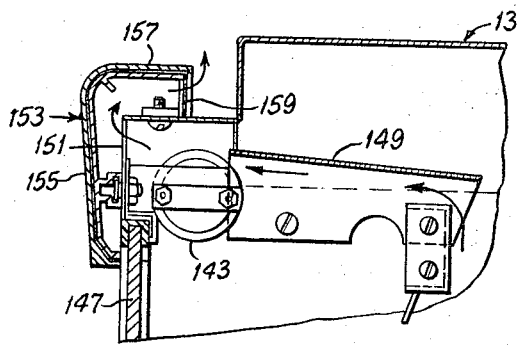

FIGS. 4 and 5 are enlarged vertical sections taken on lines 4—4 and 5—5, respectively, of FIG. 3, parts being broken away for reducing the length of the views;

FIGS. 6 and 7 are enlarged vertical sections taken on lines 6—6 and 7—7, respectively, of FIG. 3;

FIG. 8 is an enlarged vertical section taken on line 8—8 of FIG. 3;

FIG. 9 is an enlarged vertical section taken on line 9—9 of FIG. 4;

FIG. 10 is an enlarged horizontal section taken on line 10—10 of FIG. 2;

FIG. 11 is an enlarged fragment of FIG. 8;

FIG. 12 is an enlarged fragment of FIG. 3 showing an alternative construction;

FIG. 13 is a vertical section taken on line 13—13 of FIG. 12;

FIG. 14 is a vertical section taken on line 14—14 of FIG. 12;

FIG. 15 is a view similar to FIG. 12 showing another alternative construction;

FIG. 16 is an end elevation of a helix used in the FIG. 15 construction;

FIG. 17 is a section taken on line 17—17 of FIG. 15;

FIG. 18 is a view similar to FIG. 12 showing another alternative construction particularly adapted for use in vending flexible packages, such as packages of potato chips;

FIG. 19 is a vertical section taken on line 19—19 of FIG. 18;

FIG. 20 is an enlarged fragmentary plan view illustrating another embodiment particularly adapted for vending cartons of milk or the like;

FIG. 21 is an enlarged right-hand end view of FIG. 20;

FIG. 22 is an enlarged vertical section taken on line 22—22 of FIG. 20;

FIG. 23 is a vertical section taken on line 23—23 of FIG. 22;

FIG. 24 is an enlarged fragmentary vertical section taken on line 24—24 of FIG. 1; and FIG. 25 is an enlarged fragment of FIG. 24.

Corresponding reference characters indicate corresponding parts throughout the several views of the drawings.

Referring to the drawings, first more particularly to FIGS. 1 and 2, a vending machine of this invention is shown to comprise a cabinet generally designated 1 standing on legs 3. The cabinet has a bottom wall 5, left and right side walls 7 and 8, a top wall 9, a rear wall 11, a front opening 10 and a front door 13. The latter is shown as hinged at the left as indicated at 15. Within the cabinet, there are a plurality of shelves, each designated 17. Ten shelves are shown but this number is arbitrary. The shelves are mounted one above another on a vertical post 19 for horizontal swinging movement about the axis of the post, also for adjustment vertically on the post as will be made clear. As shown, the post is located adjacent the front left corner of the cabinet.

Each shelf is generally of elongate rectangular shape, and has its left front corner pivoted on the post 19 (see FIG. 3). Each shelf extends across the cabinet from the post to near the right side wall 8, but with sufficient space between the right end of the shelf (which may be referred to as its discharge end) and wall 8 for items discharged from the shelves to drop. Each shelf, as shown, comprises an assembly of top and bottom sheet metal plates 23 and 25 (see particularly FIG. 8). The top plate is formed to provide a pair of channels or troughs each designated 27 extending lengthwise of the shelf from one end thereof to the other, the bottom plate being flat. The plates are also formed to provide upstanding side walls 29 for the shelf. Each shelf carries a pair of helices, each designated 31. Each helix 31 extends lengthwise in a respective trough. The diameter of the helix is greater than the depth of the trough and the helix projects up out of the trough. Items A to be vended, such as candy bars or packages of candy, may be placed between the convolutions of each helix with end portions of the items resting on the shelf at opposite sides of the trough. Means indicated at 33 is provided for rotating each helix in such direction as to feed the items, by the screw action of the helix, in the direction toward the right end of the shelf as viewed in FIGS. 2–4. This end of the shelf is referred to as its discharge end. Each helix extends to the discharge end of its respective shelf so that it is adapted to feed items one-by-one off the discharge end of the shelf.

Post 19 extends vertically between a platform 35 located near the bottom wall 5 of the cabinet and the top wall 9 of the cabinet (see FIG. 2). Its upper end is secured to the top wall as indicated at 37 and its lower end is secured to the platform as indicated at 39. As appears in FIGS. 3 and 10, the post is of tubular cylindrical cross section. Each shelf has a bracket 41 at its front left corner formed with a vertical hub 43 which receives the post and which is rotatable on the post so that the shelf may swing horizontally about the vertical axis of the post between a vending position within the cabinet (the shelves being shown in this position in FIG. 2 and in solid lines in FIG. 3), and a loading position outside the cabinet (door 13 being open). In FIG. 3, the door 13 is shown open and one shelf 17 is shown swung out to loading position in dotted lines. The hubs 43 are vertically slidable on the post 19 for vertical adjustment of the shelves, and are held in vertically adjusted position by means of pins 45 extending through holes 47 in the post. The post has a vertical series of such holes for positioning the hubs and hence the shelves at such different elevations as may be desired. The pins underlie the hubs, and hold them up while permitting any shelf individually to be swung out to loading position outside the cabinet and then swung back to vending position within the cabinet.

Each shelf 17, when in vending position, extends horizontally across the cabinet from near the left side of the cabinet to near the right side of the cabinet. The bottom plate 25 of each shelf has an indentation 49 adapted to receive a latch 51 for latching the shelf in vending position (see FIG. 6). The latches 51 are carried by a channel member 53 which extends vertically on the inside of the rear wall 11 of the cabinet. The channel member 53 has a vertical series of holes 55 receiving screws 57 for securing the latches thereto, and the latches may be secured at different positions on the channel member depending upon the vertical adjustment of the shelves.

Each helix 31 may consist of an open-pitch coil spring, preferably formed of wire which has a generally rectangular cross section for increased resistance to endwise compression of the helix, and preferably having a plastic coating. The means 33 for rotating each helix comprises a speed-reducing gear box 59 mounted on the other end (the left end) of the respective shelf from the discharge end. Each helix is generally cylindrical but of decreasing diameter toward its left end (its driven end) to avoid jamming of the helix against the edges of the trough. Each gear box carries an electric motor M coupled to the input of the gear box. Secured on the output shaft 61 of the gear box is a member 63 formed to provide a cam 65 and a coupling 67 projecting from one face of the cam. The coupling 67 is formed to provide grooves 69 at opposite sides thereof, these grooves being open at one end and closed at the other as indicated at 71. Each helix 31 has its left end convolution secured as by welding to the rim of a sheet metal cap 73 (see FIGS. 4 and 9). This cap has tongues 75 slidably received in the grooves 69 of coupling and providing a driving connection between the output shaft 61 and the helix, the arrangement being such that the helix may be readily coupled to and uncoupled from the output shaft. Cam 65 is essentially circular with a notch 77 (see FIG. 7) and is engageable by the actuating arm 79 of a switch CS mounted on the gear box. This switch is a single-revolution switch corresponding to switch CS shown in our aforesaid United States Patent 3,085,711.

Each shelf has guides 81 on opposite sides of each helix thereon for confinement of items endwise of the items while permitting the items to slide toward the discharge end of the shelf. As shown, each guide comprises a sheet metal bar of hollow rectangular cross section. Clips 83 each having a series of fingers 85 are secured to the shelf at its left end, and the bottom of the left end of each guide is adapted to be inserted under one of the fingers for securing the left end of the guide to the shelf. Each guide has a latch 87 slidable therein and projecting from its right end, i.e., the end adjacent the discharge end of the shelf. The latch is biased in outward direction (toward the discharge end of the shelf) by a spring 89 reacting from an ear 91 struck from the guide 81, a screw 93 being threaded in the top of the guide and reaching into a groove 95 in the latch to act as a stop for the latch. The latch has a hook 97 adapted to extend down through one of a series of holes 99 (see FIG. 5) in the shelf for holding the forward end of the guide in position. The series of holes 99 and the plurality of fingers 85 provide for lateral adjustment of the guides toward and away from each helix for appropriate endwise confinement of items of different lengths. The latches 87 extend beyond the discharge end of each shelf to tend to prevent an item captured by the last convolution of the helix from falling off the discharge end of the shelf.

For each helix, there is an empty switch ES similar to the empty switch ES shown in our aforesaid United States Patent 3,085,711. Each empty switch is mounted underneath the respective shelf adjacent the discharge end of the shelf with an actuating arm 101 extending up through a slot 103 in the shelf for engagement by an item on the shelf. Arm 101 is normally held down by an item, but, when the last item in a helix is discharged, arm 101 springs up for operation of the switch ES to preclude energization of the respective motor M in a manner similar to that described in our aforesaid United States Patent 3,085,711.

Items to be vended such as candy bars and cartons are sufficiently stiff to span a trough without sagging, but bags of candy, for example, may not be sufficiently stiff to keep from sagging down into a trough and becoming jammed. Accordingly, for intermediate support of such items, each helix is provided with an insert or tongue 105 extending generally from end-to-end thereof within the convolutions of the helix generally at the level of the top of the respective trough. This insert, as shown, comprises a flat strip of sheet metal having a plastic facing 107 (see FIG. 11) to protect the plastic coating on the helix from the edges of the strip. Each shelf has extensions at its discharge end on opposite sides of each trough which are bent down to form downwardly angled lips 109 which constitute slides over which items pushed forward by the helix may nicely slide off the discharge end. Extending between these lips across the forward ends of the troughs are bridge pieces 111, also angled downward like the lips. Each insert or tongue has a downwardly angled forward end portion 113 provided on the bottom with a clip 115 for clipping it to a respective bridge piece 111. Each insert or tongue is of such width as to bear against the convolutions of the respective helix, at the level of the top of the trough, and is prevented from rotating with the helix by being clipped to the respective bridge piece 111.

As previously mentioned, the discharge ends of the shelves terminate short of the right side wall 8 of the cabinet to provide a space through which items discharged from the shelves may drop. This space is indicated at 117 in FIGS. 2 and 23. The angled lips 109 function to pitch an item discharged from a shelf out into space 117 away from the shelves below, and thus assist in avoiding jamming of items in the space 117. An item dropping in space 117 is directed by a curved guide 119 approximately to the center of a delivery pan 121, the item in the pan being accessible to the purchaser through an access opening 123 in the front door 13. As appears in FIG. 2, the two lower shelves are of shorter length than the other shelves to allow for curvature of the guide 119 to direct an item approximately to the center of the pan, and permit use of space in the cabinet which would otherwise be lost.

Referring to FIGS. 1, 2, 24 and 25, the front door 13 of the cabinet is shown to carry coin-control mechanism such as indicated at 125, with a coin chute as indicated at 127, and three display assemblies 129 one above another, for displaying the various items to be vended which are stocked in the machine and enabling a purchaser to make a desired selection. Each display assembly generally comprises a holder or tray 131 for items to be displayed having partitions 133 forming compartments 135 for individual items to be displayed. Each tray is pivotally supported on pins 137 at opposite sides of the door for swinging movement between the inclined display position in which it appears in solid lines in FIG. 24 and a swung-down open position such as shown in dotted lines for the lower tray in FIG. 24 for insertion of items in the compartments. Latches for retaining the trays in display position are indicated at 139. With the trays in display position, items displayed thereon are visible through windows 141 in door 13, each item being located above a purchaser-operable push button switch PS corresponding to switches PS shown in our aforesaid United States Patent 3,085,711. Extending between the sides of the door are three electric lamps, each designated 143, one above each display assembly. These lamps generate heat, and it is desirable to dissipate this heat to avoid spoilage of items such as candy or other food items stocked in the machine. For this purpose, each display tray carries a rear panel 145 spaced from and at such an angle to the back of the tray that, when the trays are in display position, the panels extend generally vertically and define in conjunction with the backs of the trays of the vertical flue F for upward flow of hot air. Each panel 145 has forwardly extending side walls 147 which are secured at their forward ends to the respective tray, leaving a space between the back of the tray and the panel for forming the flue F. It will be observed that when the trays are in display position, their lower edges engage the door and block passage of air upward in front of the trays, but hot air may flow upward through flue F in back of the tray, while being substantially blocked by panels 145 from entering the cabinet and heating items stocked on the shelves in the cabinet. The upper display assembly has a hood 149 for directing the hot air which flows upward through the flue toward an opening 151 in the front wall of the door. To prevent the hot air from exiting forward, a shield 153 is provided at the top of the front wall of the door, having a portion 155 spaced out from the front wall of the door and a portion 157 curved around over the top of the door, with a screen 159 extending across the space between portion 157 and the top of the door for exit of air without entry of insects or dirt. Hot air generated by the lamps flows up the flue, through opening 151 into the passage provided by the shield, and then out through the screen as indicated by the arrows in FIGS. 24 and 25.

It will be understood that the switches PS and the coin-control mechanism 125 control the operation of the machine essentially in the same manner as described in our aforesaid United States Patent 3,085,711. Other suitable circuitry may be used, the operation being such that on deposit of coin and pushing in any push-button switch PS, the helix 31 corresponding to that switch is driven through a single revolution for dispensing an item corresponding to the item displayed above that particular switch PS. For loading the machine, each shelf 17 may be swung out to the loading position such as indicated in dotted lines in FIG. 3, and items may then readily be placed from above on the shelf between the convolutions of the helices. The vertical spacing of the shelves is determined by the height of items as placed on the shelves, and may be varied so that some shelves may accommodate higher items and others may accommodate lower items. In any event, the vertical spacing of the shelves is kept to a minimum so that a relatively large number of shelves may be provided for high capacity of the machine in relation to the space available in the cabinet.

It will be observed that items such as candy bars and boxes of candy (carton candy) inherently extend at an angle to the direction of feed due to the pitch angle of the helix. Accordingly, one end of each item trails the other as the item is advanced by the helix. The leading end of the item (which would be its end toward the bottom of the sheet of drawings as viewed in FIG. 3) is therefore normally advanced off the discharge end of the shelf before the trailing end. In some instances, this may tend to cause the item to hang up on the shelf, particularly in the case of dispensing of boxes, one flat edge of which rests on the shelf on opposite sides of the trough.

FIGS. 12–14 illustrate a construction for assisting the advance of the trailing end of an item off a shelf to minimize any tendency of the item to hang up on the shelf, involving the provision of a fixed cam 171 on the shelf at its discharge end on that side of the trough over which the trailing ends of the items slide. This cam is formed to tilt up the trailing end of an item sliding thereover as the leading end of the item reaches the discharge end of the shelf, and to assist the trailing end to slide off the shelf. As shown, the cam has an arcuate upper edge for this purpose. The trailing end of the item rides up the rearward upwardly inclined end of the cam so that the item becomes tilted (see FIG. 14); then the trailing end of the item nicely slides off the forward downwardly inclined end of the cam at an accelerated rate so that it tends to catch up with the leading end of the item, thereby tending to line up the item crosswise of the delivery end of the shelf.

In some instances, candy bar wrappers may tend to become worked under the guides 81 as the candy bars are advanced toward the discharge end of the shelf. Cam 171 has been found to be effective to pull the wrappers from beneath the guides 81 to free the bars for discharge from the discharge end of the shelf.

FIGS. 15, 16 and 17 show an alternate construction for accomplishing essentially the same function as cam 171, in which the helix 31 is provided at its discharge end with what may be termed a kicker 173. This consists of a partial turn of wire having one end secured as indicated at 175 to the inside of the helix at a point rearward of the end of the helix, and formed with a pitch angle greater than the pitch angle of the helix. This kicker reaches generally to the end of the helix and functions to speed up the travel of the trailing end of an item so that it arrives at the discharge end of the shelf at about the same time as the leading end of the item, thereby tending to line up the item crosswise of the delivery end of the shelf.

A variation particularly adapted for enabling trouble-free dispensing of flaccid packages, such as bags of potato chips for example, is illustrated in FIGS. 18 and 19. Flaccid packages have a tendency to slide off out of the helix to the side of the helix adjacent the trailing end of the package. If not restrained, the package may slide completely out of the confines of the helix, leave a gap in the helix, and tend to jam the operation of the helix. To prevent this, a pusher block 181, which may be simply a wooden block simulating a stiff package, is placed in the last convolution of the helix for backing the package immediately ahead of the block to prevent that package from sliding out of the helix. This package then prevents the package ahead of it from sliding out of the helix, and each of the remaining packages is prevented from sliding out of the helix by the preceding package. The block is provided with a vertical slot 183 in its bottom, this slot being located in the vertical plane of arm 101 of empty switch ES. When the last package is vended by the helix the arm 101 moves up into the slot 183 so that the motor M driving the helix cannot be energized. Were it not for this slot the pusher block 181 would hold switch arm 101 down, thus permitting the block itself to be vended. A pin 185 extends down from the block into the trough adjacent one side of the trough to maintain the block in position in the helix.

FIGS. 20–23 illustrate a construction particularly for vending relatively large cartons, such as gable-top milk cartons. This comprises a special shelf construction adapted for adjustment of the width of the helix-receiving channels or troughs. FIGS. 20 and 21 show only half a shelf and one trough; it will be understood that the half of the shelf which is not shown is essentially a duplicate of the half which is shown. The shelf is designated in its entirety by the reference character 201 and comprises two sheet metal side members, one of which appears in FIGS. 20 and 21 and which is designated 203, and a sheet metal central plate 205. The side member 203 is generally of stepped cross section, having a lower horizontal ledge 207, a panel 209 angled upward and outward from the outer edge of ledge 207, an upper horizontal ledge 211 extending outward from the upper edge of panel 209, and a vertical side flange 213 extending upward from the outer edge of ledge 211. The central plate 205 has a stepped formation at each side, each such formation comprising a panel 215 angled downward and outward from the side edge of the plate and a lower horizontal ledge 217 extending outward from the lower edge of panel 215. Panels 209 and 215 define the sides of a channel or trough 219, and the bottom of the trough is constituted by a relatively narrow plate 221 supported on the lower ledges 207 and 217. The side member and central plate are relatively adjustable toward and away from one another to vary the width of the trough, ledges 207 and 217 and plate 205 having registering transverse slots such as indicated at 223 with bolt and nut fasteners 225 extending through the slots for securing the parts in adjusted position.

A helix 227 having relatively widely spaced convolutions for reception of cartons such as indicated at C extends from one end of the shelf to the other in the trough 219, projecting well upward out of the trough. Extending through the helix is an insert 229, which may be formed of sheet metal, generally of inverted T shape in cross section, having a vertical web 231 and bottom flanges 233 projecting laterally on opposite sides of the web. Insert 229 has its forward end supported on a short post 235 secured to the forward end of the trough bottom plate 221. A pin 237 extends from the rearward end of the web 231 loosely through a central hole 239 in disk 241 which constitutes an end head for the helix for supporting the rearward end of the insert. The disk is cradled in the trough, being rotatable on its axis without rotating the insert. A nut 243 may be threaded on the end of the pin for holding the parts in assembly without impeding the rotation of the disk. The rearward end of the helix is secured to the disk as indicated at 245. The disk has means such as indicated at 247 on its rearward face for union with a coupling 249 on the output shaft 251 of a gear box similar to the gear box 59. On rotation of shaft 251, disk 241 is rotated to rotate the helix. Coupling 249 is formed on the forward face of a cam 253, which is similar to cam 65 except that it has two diametrically opposed notches 255 for accepting switch actuating arm 79 so that the helix is rotated half a revolution on each cycle instead of a full revolution.

Flanges 233 of the insert 229 are located somewhat above plate 205 and ledge 211 of shelf 201 and have their outer margins angled downward toward this ledge 211 and the shelf to serve as rails for supporting two series of cartons C on opposite sides of web 231 of the insert 229. This web serves as a partition between the two series and as a guide for the bottom edges of the cartons lying alongside the web. The cartons in one series (which may be referred to as the outside series) are inserted between the convolutions of the helix on the outside of the web or partition 231, resting in slightly inclined position on the outside flange 233 and ledge 211. The cartons in the other series (which may be referred to as the inside series) are inserted between the convolutions of the helix on the inside of the web or partition 231, resting in oppositely inclined position on the inside flange 233 and plate 205. Flange 213 serves as a guide for the outside of the cartons of the outside series, and a guide 81 such as previously described is provided for the outside of the cartons of the inside series. On successive half revolutions of the helix, cartons are dispensed alternately from the two series. The insertion of the cartons in two series as described in effect doubles the capacity as related to insertion in single series as shown in FIG. 3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a vendor, a shelf having a channel extending lengthwise thereof, a helix extending lengthwise in the channel and projecting up out of the channel, an insert extending through the helix, said insert having an upwardly extending central guide and a pair of rails on opposite sides of the guide, whereby a first series of items may be placed between the convolutions of the helix resting on the shelf at one side of the channel and on the rail toward that side of the channel, and a second series of items may be placed between the convolutions of the helix resting on the shelf at the other side of the channel and on the rail toward said other side of the channel, and means for rotating the helix in half-revolutions for feeding said items in the direction toward one end of the shelf constituting a discharge end of the shelf and effecting discharge of items over said discharge end alternately from said series.

2. A vendor comprising a cabinet having a door, a plurality of shelves in the cabinet, each shelf having at least one channel extending lengthwise thereof and carrying a helix extending lengthwise in the channel and projecting up out of the channel whereby items to be vended may be placed between the convolutions of the helix and rest on the shelf, said helix, upon rotation thereof in one direction, being adapted to feed said items in the direction toward one end of the shelf constituting a discharge end of the shelf, means for rotating each helix in said one direction, and means mounting said shelves in the cabinet for swinging movement of each shelf in a generally horizontal plane about a vertical axis located adjacent a front corner of the cabinet between a vending position and a loading position, said shelves when in vending position extending horizontally in the cabinet one above another from near one side of the cabinet to near the other side of the cabinet with the discharge ends of the shelves sufficiently spaced from the adjacent side of the cabinet to provide a space through which items discharged from the shelves may drop, each shelf when in loading position, and with the door of the cabinet open, extending forward out of the cabinet, elongate items being positioned between the convolutions of the helix oblique to the direction of feed, thereby having a leading end and a trailing end in relation to the direction of feed, and means for accelerating the trailing ends of the items as the items reach the discharge end of a shelf to tend to bring the items to a position more nearly at right angles to the direction of feed, said accelerating means comprising cams on the shelves over which the trailing ends of the items ride, said cams being formed to effect tilting up and sliding forward of the trailing ends of the items.

3. A vendor comprising a cabinet having a door, a plurality of shelves in the cabinet, each shelf having at least one channel extending lengthwise thereof and carrying a helix extending lengthwise in the channel and projecting up out of the channel whereby items to be vended may be placed between the convolutions of the helix and rest on the shelf, said helix, upon rotation thereof in one direction, being adapted to feed said items in the direction toward one end of the shelf constituting a discharge end of the shelf, means for rotating each helix in said one direction, and means mounting said shelves in the cabinet for swinging movement of each shelf in a generally horizontal plane about a vertical axis located adjacent a front corner of the cabinet between a vending position and a loading position, said shelves when in vending position extending horizontally in the cabinet one above another from the rear one side of the cabinet to near the other side of the cabinet with the discharge ends of the shelves sufficiently spaced from the adjacent side of the cabinet to provide a space through which items discharged from the shelves may drop, each shelf when in loading position, and with the door of the cabinet open, extending forward out of the cabinet, elongate items being positioned between the convolutions of the helix oblique to the direction of feed, thereby having a leading end and a trailing end in relation to the direction of feed, and means for accelerating the trailing ends of the items as the items reach the discharge end of a shelf to tend to bring the items to a position more nearly at right angles to the direction of feed, said accelerating means comprising an auxiliary coil incorporated in the helix at its discharge end having a greater pitch angle than the pitch angle of the helix.

4. A vendor comprising a cabinet having a door, a plurality of shelves in the cabinet, each shelf having at least one channel extending lengthwise thereof and carrying a helix extending lengthwise in the channel and projecting up out of the channel whereby items to be vended may placed between the convolutions of the helix and rest on the shelf, said helix, upon rotation thereof in one direction, being adapted to feed said items in the direction toward one end of the shelf constituting a discharge end of the shelf, means for rotating each helix in said one direction, and means mounting said shelves in the cabinet for swinging movement of each shelf in a generally horizontal plane about a vertical axis located adjacent a front corner of the cabinet between a vending position and a loading position, said shelves when in vending position extending horizontally in the cabinet one above another from near one side of the cabinet to near the other side of the cabinet with the discharge ends of the shelves sufficiently spaced from the adjacent side of the cabinet to provide a space through which items discharged from the shelves may drop, each shelf when in loading position, and with the door of the cabinet open, extending forward out of the cabinet, an empty switch under each shelf at its discharge end, said switch having an actuting member biased upward through an opening in the shelf, said actuating member being adapted to be held down by items on the shelf, and a pusher between the convolutions of at least one helix at the trailing end of the items which are fed forward by that helix for preventing said items from sliding off to one side of the helix, said pusher having a recess for receiving the actuating member of the respective empty switch when the pusher reaches the discharge end of the shelf so that the actuating member may move up when the pusher reaches the discharge end of the shelf.

5. In a vendor, a shelf having a channel extending lengthwise thereof, a helix extending lengthwise in the channel and projecting up out of the channel whereby items to be vended may be placed between the convolutions of the helix and rest on the shelf, said helix, upon rotation thereof in one direction, being adapted to feed said items in the direction toward one end of the shelf constituting a discharge end of the shelf, means for rotating each helix in said one direction, and an insert extending through the helix providing support for said items above the bottom of the channel and between the sides of the channel, said shelf having downwardly angled lips at its discharge end on opposite sides of the channel, and a bridge piece extending between said lips, the forward end portion of said insert extending out of the forward end of the helix and being inclined downward toward said bridge piece, and means for securing said forward end portion of the insert to said bridge piece.

6. In a vendor as set forth in claim 5, said insert having a width such that its side edges engage the convolutions of the helix generally at the level of the top of the channel.

7. A vendor comprising a cabinet having a bottom wall, left and right side walls, a top wall, a rear wall, a front opening and a front door, a post within the cabinet extending vertically adjacent one edge of the front opening, a plurality of generally rectangular shelves each having a width approximating the spacing of the post from the rear wall of the cabinet, the length of each shelf from one of its ends to the other being less than the width of the front opening of the cabinet, each shelf having a hub at one corner at one end thereof constituting a front corner of the shelf by means of which the shelf is pivoted on the post for swinging movement in a horizontal plane about the vertical axis of the post between a vending position within the cabinet wherein the shelf extends across the cabinet with its said one end closely adjacent one side wall of the cabinet and with its other end spaced from the other side wall of the cabinet and a loading position projecting out through the front opening of the cabinet, at least some of the shelves also having their hubs mounted for vertical sliding on the post for vertical adjustment of these shelves, with means for holding the adjustable shelves in vertically adjusted position on the post, said shelves when in vending position in the cabinet lying one above another, each shelf having at least one channel extending lengthwise thereof and carrying a helix extending lengthwise in the channel and projecting up out of the channel whereby items to be vended may be placed between the convolutions of the helix and rest on the shelf, said helix, upon rotation thereof in one direction, being adapted to feed said items in the direction toward the said other end of the shelf and to effect dropping off of the endmost item from the said other end of the shelf, the length of each shelf being sufficiently less than the width of the front opening of the cabinet to provide a space between the said other ends of the shelves and the other side wall of the cabinet for dropping down below all the shelves of an item discharged from any shelf and also to provide sufficient clearance between the rear corner of each shelf at its said other end and the other edge of the front opening of the cabinet to enable each shelf to be swung out of the front of the cabinet through said front opening about the vertical axis of the post.

References Cited

UNITED STATES PATENTS

| | | | |
|---|---|---|---|
| 339,561 | 4/1886 | Locke | 198—213 X |
| 1,185,356 | 5/1916 | Weaver | 221—29 |
| 2,599,173 | 6/1952 | Hamilton | 194—10 |
| 2,925,194 | 2/1960 | Mihalek | 221—11 |
| 3,085,711 | 4/1963 | Holstein et al. | 221—75 |

FOREIGN PATENTS 333,740 3/1921 Germany.

SAMUEL F. COLEMAN, *Primary Examiner.*